: 
United States Patent [19]

Finet et al.

[11] Patent Number: 5,487,315
[45] Date of Patent: Jan. 30, 1996

[54] ROTATIONAL MOTION LIMIT DETECTOR SYSTEM AND METHOD

[75] Inventors: Philip J. Finet, Milwaukee; Edward Kirkham, Brookfield, both of Wis.

[73] Assignee: Giddings & Lewis, Fond du Lac, Wis.

[21] Appl. No.: 93,232

[22] Filed: Jul. 16, 1993

[51] Int. Cl.⁶ ............................................... B25G 3/00
[52] U.S. Cl. ............................ 73/865.9; 403/27; 200/47
[58] Field of Search .......................... 73/865.9; 340/679, 340/686, 689, 691; 324/207.25; 33/1 N, 1 PT, 501.04, 520, 538, 561, DIG. 1; 200/6 B, 6 A, 6 R, 27 R, 28, 30 R, 56 R, 47, 61.52, 61.88, 244; 403/27

[56] References Cited

U.S. PATENT DOCUMENTS

| | | | |
|---|---|---|---|
| 2,214,685 | 9/1940 | Stone, Jr. ................................ | 340/686 |
| 4,027,119 | 5/1977 | Tezuka ..................................... | 200/6 A |
| 4,581,826 | 4/1986 | Ernst ........................................ | 33/561 |
| 4,679,957 | 7/1987 | Bauer ....................................... | 403/27 |

*Primary Examiner*—R. Raevis
*Attorney, Agent, or Firm*—Foley & Lardner

[57] ABSTRACT

A system for detecting a limit of acceptable rotation for a joint is disclosed. The system includes a support that supports the joint and keeps its pivot point substantially stationary with respect thereto. The system also includes an extensible leg connected to the joint. A contoured member is mounted adjacent the extensible leg and has a surface shaped as a portion of a sphere. The contoured member is located so the pivot point of the joint substantially coincides with the center of the sphere and the periphery of the contoured member corresponds to the limit of acceptable rotation for the joint. Thus, as the leg pivots, the contoured member also moves a similar amount. A detector is used to detect the periphery of the contoured member surface and to assist in preventing further rotation of the joint in that direction.

2 Claims, 3 Drawing Sheets

ROTATIONAL MOTION LIMIT DETECTOR SYSTEM AND METHOD

FIELD OF THE INVENTION

The present invention relates to joints that can rotate around a pivot point. In particular, the invention relates to a system for detecting the rotational position of such joints and for preventing such joints from rotating beyond an acceptable range.

BACKGROUND OF THE INVENTION

Many machines throughout industry have joints which can rotate around a pivot point. An example of a joint rotating around a pivot point is a ball and socket joint. Another example of such a joint would be a joint having two gimbals so constructed that the rotational axes of the gimbals are mutually perpendicular to one another. For a number of reasons, it is often undesirable for these joints to rotate beyond an acceptable range of motion.

Joint rotation is usually dictated by the movement of rods or other apparatus connected to the joint. In many cases, the movement of rods or other apparatus connected to a joint is driven mechanically. There are several kinds of mechanical driving systems, including hydraulic cylinder systems or screw systems.

An electrical controller can be used to coordinate the movement of rods and the rotation of joints. A controller is usually programmed to maintain the rotation of joints within an acceptable range of motion. Sometimes, however, joints may get rotated beyond limits. This may happen because of bugs in software, or other design or setup flaws.

It is therefore desirable to have a system that can detect when a joint is on the verge of being rotated too far. U.S. Pat. No. 2,828,458 shows a limit switch system designed to do this, but this limit switch is complex and has many mechanical components. Such a limit switch system is not practical for complicated machines having many joints. It is too bulky, and each of the numerous components of the switch provide an opportunity for the switch to fail.

Electrically controlled machines can get very complicated and have many joints. One such machine is disclosed in U.S. Pat. No. 4,988,244. That machine, as well as others, can crash if one or more joints are rotated beyond a limit of acceptable motion. It can therefore be appreciated that a mechanically simple, reliable, and durable means for detecting a limit of acceptable joint rotation is desirable.

SUMMARY OF THE INVENTION

The present invention provides a way to detect when a joint approaches or rotates beyond a limit of acceptable rotation. The invention uses a spherically-shaped surface to define the limit of acceptable rotation, and detects the location of a peripheral edge of the surface in order to determine the location of the limit of acceptable rotation. The invention is simple, reliable, and durable.

In one aspect, the invention is a system for detecting a limit of acceptable rotation for a joint that can rotate around a pivot point. The system includes a support for supporting the joint so that the pivot point of the joint is substantially stationary with respect to the support, and a cam or contoured member having a surface shaped as a portion of a sphere. The or contoured member is located so that the pivot point of the joint substantially coincides with the center of the sphere. The periphery of the contoured member surface defines the limit of acceptable rotation for the joint. The system also includes a detector, preferably a proximity detector, which detects whether the surface is directly opposite the detector. When the detector detects the periphery of the surface, the system has detected that the joint is approaching the limit of acceptable rotation. At that point, a signal can be sent from the detector, and the joint can be prevented from rotating beyond the limit of acceptable rotation.

It is preferred that the contoured member be mounted to rotate contemporaneously with the joint and that the detector be mounted to the support so that it is stationary relative to the support. The detector is preferably spring-loaded towards the contoured member. It is also preferred that a collar be located around the detector where a front face of the collar is located slightly closer to the contoured member than the front of the detector. The collar is also larger in diameter than the detector. In the preferred form, the collar presses against the spherical surface, and the detector remains a substantially fixed distance from the spherical surface.

In another aspect, the present invention is a method for preventing a joint that can rotate around a pivot point from rotating beyond a limit of acceptable rotation. The method involves supporting the joint so that the pivot point of the joint is substantially stationary with respect to a support, mapping a range of acceptable rotation for the joint on a spherical surface where a boundary of the range corresponds to the limit of acceptable rotation, locating the map in a position so that the center of the sphere defining the spherical surface of the map substantially coincides with the pivot point of the joint, monitoring a relative location of the map as the joint rotates in one or more directions along a path, and, if the relative location of the map is such that continued rotation of the joint along the path will cause the relative location of the map to be displaced beyond the boundary of the map, stopping rotation of the joint along the path before the joint rotates beyond the limit of acceptable rotation. In a preferred embodiment, the rotation of the joint along the path is stopped by relaying a signal related to the relative location of the map to a machine controller, using the signal in the machine controller to determine a proper direction to rotate the joint so that the joint does not rotate beyond the limit of acceptable rotation, and rotating the joint in the proper direction as determined in the machine controller.

An object of the invention is to accurately detect the limit of acceptable joint rotation before a joint rotates beyond the limit. The invention can achieve this object by using a spherically-shaped surface cut into the shape of a map that corresponds directly to the range of acceptable joint rotation. Also, a detector can be securely mounted and located so that the surface passes closely in front of the detector at all times. The close proximity of the detector to the spherical surface enhances the effectiveness of the detector, especially under less than ideal conditions. The close proximity of the detector to the spherical surface is possible because the spherical shape of the surface allows both the detector and the spherical surface to be located at nearly (but not exactly) the same radial distances from the pivot point.

Another object of the present invention is to provide a rotational motion limit detector with few moving parts. The present invention can achieve this object because it requires only two components, the conaured member and the detector, to move relative to one another.

Another object of the invention is to provide a way of detecting an acceptable limit of joint rotation that is reliable and durable. The present invention achieves this object by not only using few moving parts, but also by allowing for the use of the collar around the detector. The collar holds the detector slightly away from the contoured member surface so the detector cannot scrape or gouge the contoured member, and the integrity of the detector is thus protected.

Other objects and advantages of the invention will become apparent upon reading the following detailed description and appended claims, and upon reference to the accompanying drawings.

DESCRIPTION OF THE PREFERRED EMBODIMENT

Figure 2:
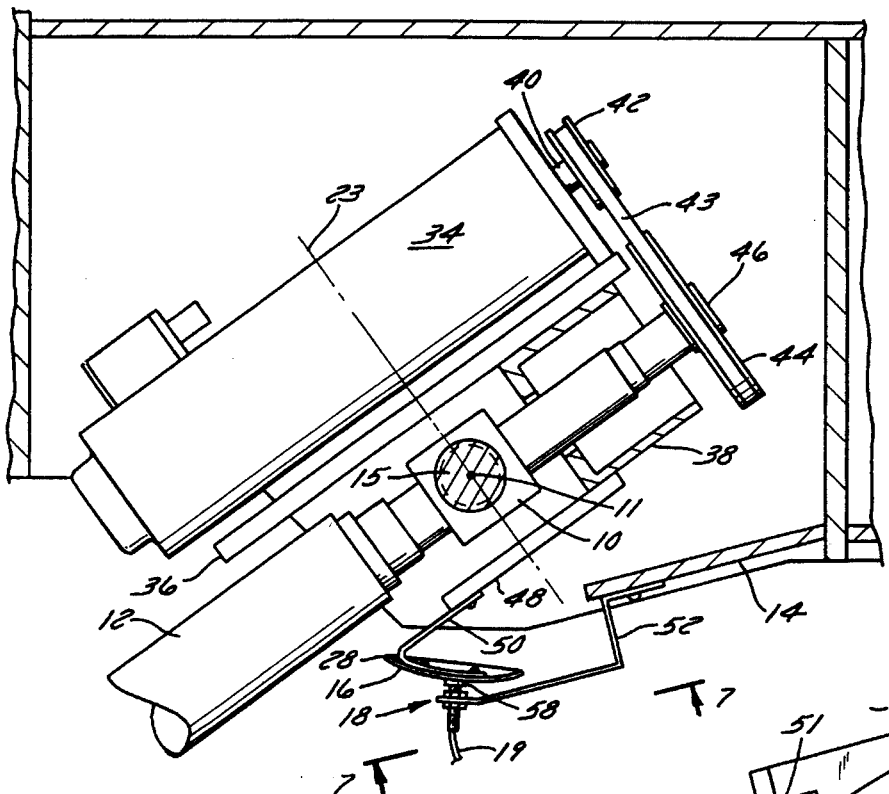
FIG. 2 is a side elevational view of the preferred embodiment of the present invention.

Referring to FIG. 2, the preferred embodiment of the present invention is described in association with a joint 10 that connects a leg 12 to a support 14. The leg 12 is connected in such a manner that it may pivot around two rotation axes which are mutually perpendicular to each other and intersect at a pivot point 11. The invention detects when the joint 10 will rotate beyond a limit of acceptable rotation. To do this, the invention uses a cam or contoured surface member 16 as a map of the range of acceptable rotation for the joint 10, and a detector 18 for detecting the position of member 16 in relation to the detector 18. A signal can then be sent from the detector 18 through a wire 19 to a computer 101 (see FIGS. 8 and 9) to control the rotation of the joint 10 so that it does not rotate beyond the limit of acceptable rotation.

The joint 10, leg 12, and support 14 shown in FIGS. 1 through 4 is similar to corresponding joint assemblies shown in U.S. Pat. No. 4,988,244 by Sheldon, et al. for a "Six Axis Machine Tool". In U.S. Pat. No. 4,988,244, the rotation of the joint assemblies is dictated by coordinated movement of several legs controlled by a computer 101. Reference should be made to U.S. Pat. No. 4,988,244 for a detailed description of the control system that controls the movement of the legs 12.

For the purposes of the present invention, it is sufficient to understand that an electric motor 34 drives a ball screw mechanism to adjust the length of leg 12. The leg 12 is straight at all times. Reference can also be made to U.S. Pat. No. 4,988,244 for more information regarding the particular configuration of the ball screw mechanism.

Figure 3:
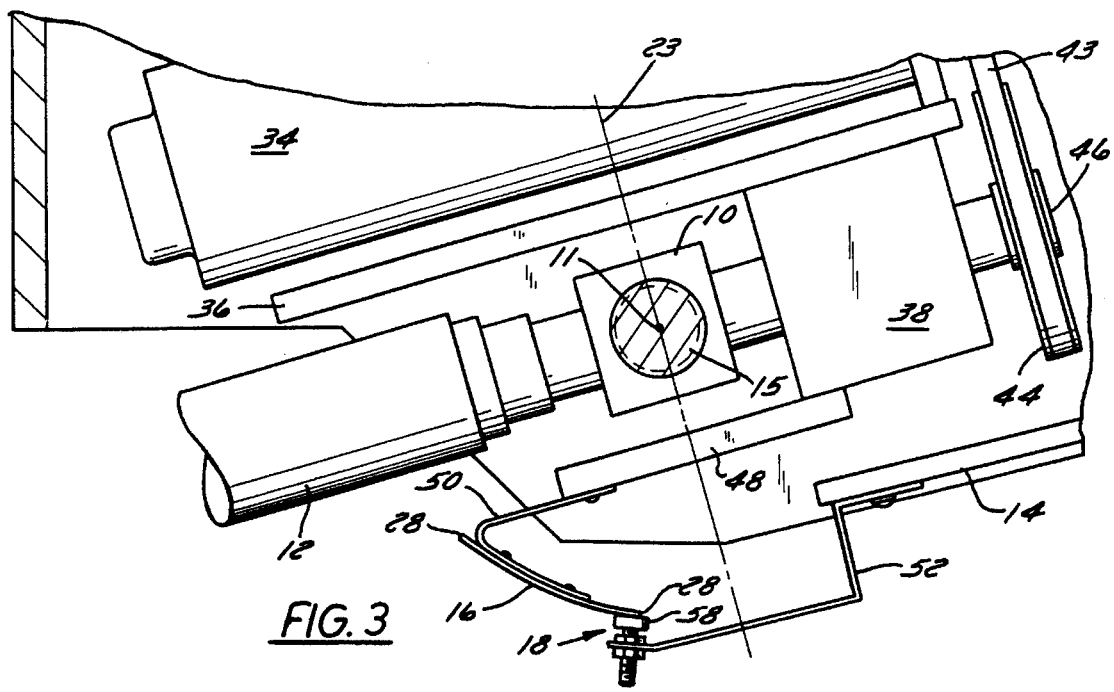
FIG. 3 is a side elevational view of the preferred embodiment of the present invention showing a joint being rotated clockwise to a limit of acceptable rotation.
Figure 4:
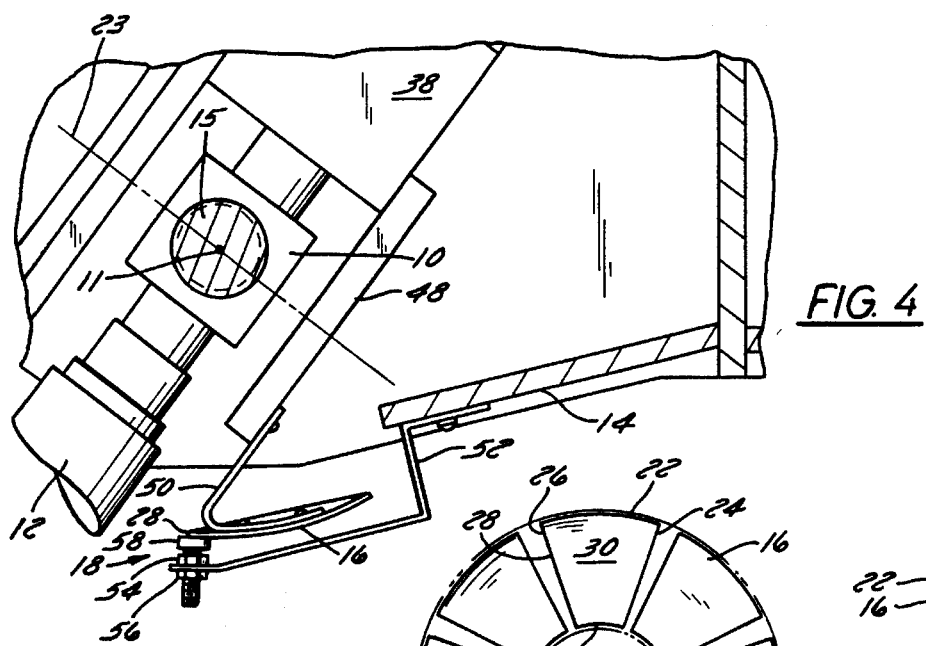
FIG. 4 is a view similar to FIG. 3 except the joint is rotated counter-clockwise to a limit of acceptable rotation.

Referring to FIGS. 2 through 4, the joint 10 is mounted to the support 14 by a support rod 15 (represented by a dashed line). The joint 10 can pivot about two axes which are mutually orthogonal to each other. Rotation of the leg 12 in a vertical plane is depicted in FIGS. 3 and 4. When the leg 12 rotates in a vertical plane, the leg 12 pivots about an axis of the joint that is perpendicular to both the vertical plane and the longitudinal axis of the leg 12, and also passes through the pivot point 11. When the leg 12 rotates in a direction orthogonal to the vertical plane, the leg 12 rotates around an orthogonal axis 23 also passing through pivot point 11. The pivot point 11 remains in a substantially constant position relative to the support 14. It is preferred that the pivot point 11 be completely stationary relative to the support 14, although such precision may not always be possible in practice.

The electric motor 34 is mounted to a bracket 36 which is mounted to a housing 38 that contain a portion of the ball screw mechanism which adjusts the length of the leg 12. The motor 34 rotates a shaft 40 to drive the ball screw mechanism. There is a pulley 42 connected to the shaft 40 and a pulley 44 connected to the leg 12. A belt 43 connects the pulleys 42 and 44 and rotates the leg 12 in a direction corresponding to the rotation of the electric motor shaft 40. The screw ball mechanism lengthens or shortens the leg 12 depending on the direction of rotation of the electric motor shaft 40. The distance between the end 46 of the leg 12 with the pulley 44 and the pivot point 11 remains constant at all times, even when the leg 12 is lengthened or shortened.

As noted above, the joint 10 in this particular embodiment is a joint holding a leg in a Six Axis Machine Tool as described in U.S. Pat. No. 4,988,244. That apparatus has six legs 12 which suspend the support 14 above a lower platform (not shown). A workpiece can be placed on the platform and can be machined by a cutting tool 64 (see FIG. 1) suspended from support 14. The length of each of the legs 12 can be increased or decreased independently of one another in a coordinated manner to adjust the orientation of the support 14 and the cutting tool 64 in relation to the workpiece. As one of the legs 12 is shortened and a corresponding leg 12 is lengthened, each of the joints 10 must rotate to accommodate the new orientation of the support 14.

Figure 8:
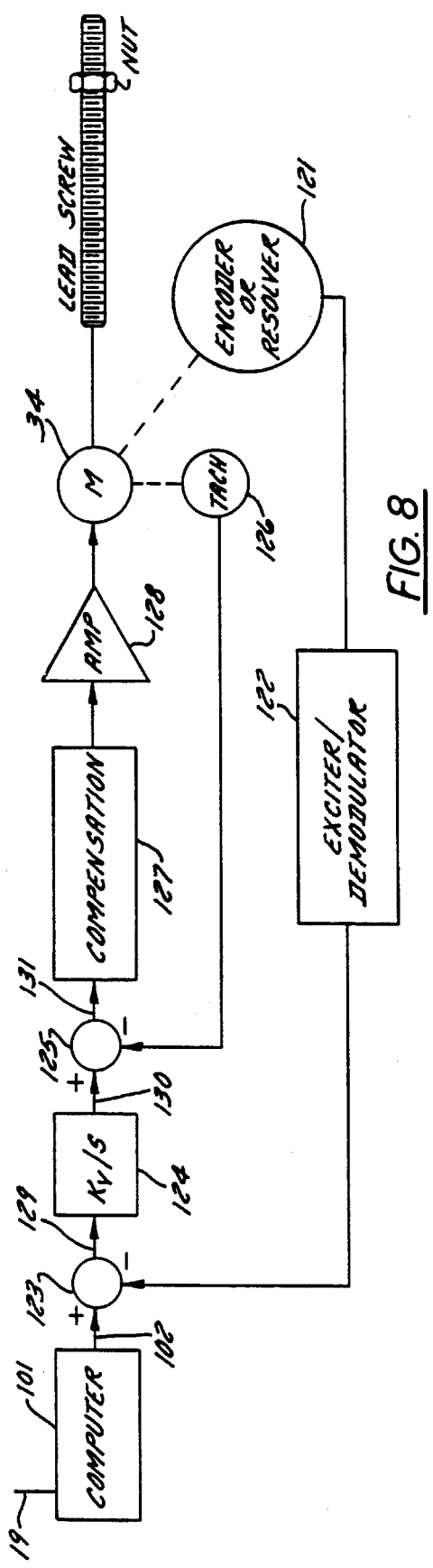
FIG. 8 is a schematic diagram of a control in accordance with the invention.
Figure 9:
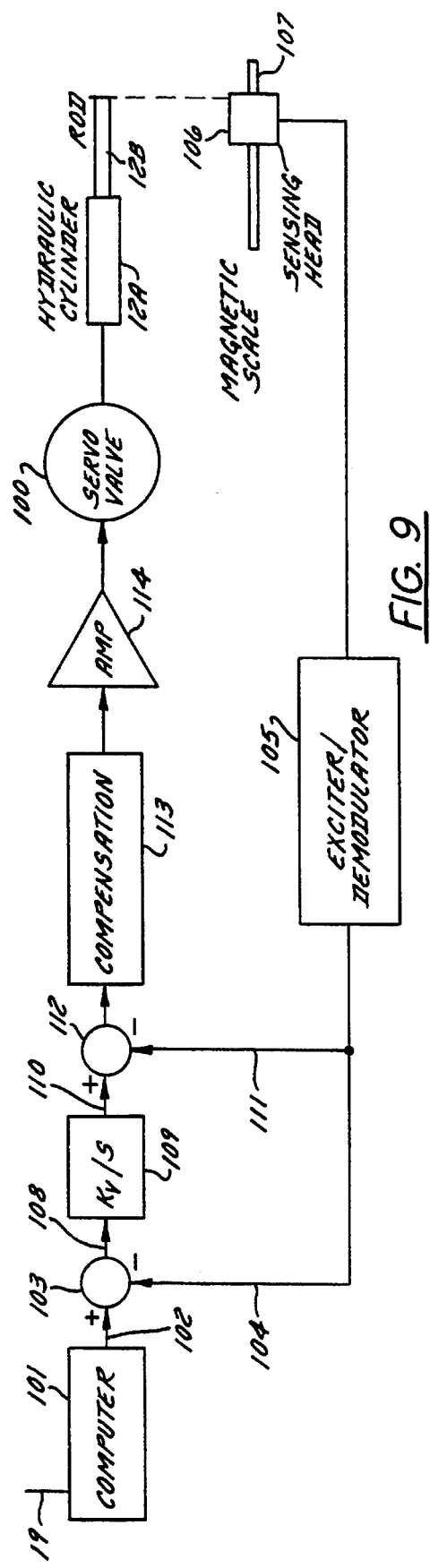
FIG. 9 is a schematic diagram of another control in accordance with the invention.

A computer 101 can be used to coordinate the lengthening and shortening of each of the legs 12 to obtain various orientations of the support 14. A suitable control scheme is illustrated in FIGS. 8 and 9. In FIG. 8, a control scheme for a screw ball mechanism is shown. The illustration shows motor 34 rotating a lead screw and nut arrangement. The computer 101 produces an output position command in a line 102. An encoder or resolver 121 is connected to the motor 34 to provide a feedback position signal through an exciter/demodulator 122. The feedback position signal is compared at a summing junction 123 with the position command from the computer 101 to produce a position error signal in line 129. The position error signal is fed to an integration network 124 which outputs a velocity command in line 130. The velocity command is compared in a summing junction 125 with the velocity position signal from a tachometer 126 connected to the motor 34 to produce a velocity error signal in line 131. The velocity error signal is fed to a compensation network 127 where phase shift compensation occurs. The resulting compensated signal is fed to an amplifier 128 which provides an appropriate signal to the motor 34. A similar control loop leading from the computer would be provided for each of six legs 12 and the computer 101 would generate an output position command for the desired position of each of the six legs 12 to achieve a particular finite orientation of the support 14.

The control arrangement in FIG. 9 is similar to that in FIG. 8 but is shown in relation to a system using hydraulics, rather than a ball screw mechanism. In FIG. 9, the leg 12 is a hydraulic cylinder 12A with a piston leg 12B and the length of the leg 12 is controlled by a servo valve 100 which controls a volume of hydraulic fluid in the cylinder 12A on each side of the piston 12B and therefore the length of the leg 12. The computer 101 produces an output position command in a line 102. That position command is compared in a summing circuit 103 with a feedback position signal in a line 104 leading from an exciter/demodulator 105 that receives a signal from a sensing head 106 traveling along a magnetic scale 107. The sensing head 106 is coupled to the piston rod 12B so that changes in position of the piston rod 12B will be reflected in changes in position of the sensing head 106 along the magnetic scale 107 which is at a known position, either fixed or varying, with respect to the hydraulic cylinder 12A. The summing circuit 103 produces a position error signal in a line 108 which inputs to an integration network 109, the output of which is a velocity command in line 110. The velocity command is compared with a velocity feedback signal in line 111 leading from the exciter/demodulator 105 in a summing circuit 112 which produces an output signal representative of a velocity error. This velocity error signal is fed to a compensation network 113 where phase shift compensation occurs. The resulting compensated signal is fed to an amplifier 114 which in turn controls the servo valve 100. Once again, there would be a similar loop for each of the six legs 12 of the machine.

Figure 7:
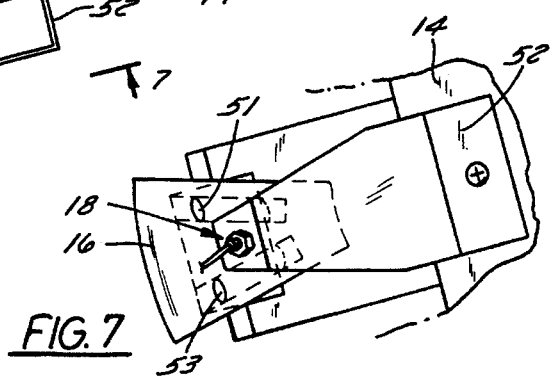
FIG. 7 is a view taken from lines 7—7 in FIG. 2.

Referring again to FIG. 2, contoured surface member 16 is mounted to a cam support 48 with a bracket 50 having two fingers 51 and 53 (see FIG. 7), and a V-shaped cross section. The cam support 48 is fixed to the housing 38. The bearing housing 38 is connected to the leg 12 with a yoke (not shown but described in U.S. Pat. No. 4,988,244) in such a manner that the housing 38 does not rotate with respect to the longitudinal axis of the leg 12. The motor 34 is connected to bracket 36 which is fixed to the housing 38, so the motor 34 does not rotate around the longitudinal axis of the leg 12 either. However, the motor 34 and the contoured surface member 16 rotate contemporaneously with the leg 12 as the leg 12 rotates about the two mutually orthogonal axes intersecting at the pivot point 11.

Figure 5:
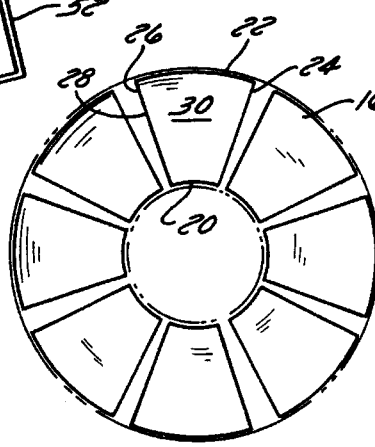
FIG. 5 is a front elevational view of a portion of a spherical shell dissected into eight cams.
Figure 6:
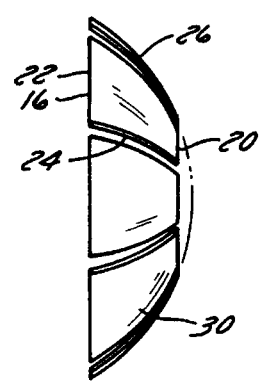
FIG. 6 is a side elevational view of the dissected portion of the spherical shell.

Referring in particular to FIGS. 5 and 6, member 16 is a portion of a spherical metal shell, fabricated by cutting a spherical metal shell along appropriate lines of latitude 20 and 22 and longitude 24 and 26. Each member 16 thus has a peripheral edge 28 defined along these lines of latitude 20 and 22 and longitude 24 and 26.

Member 16 is mounted so that the spherical center of the spherical surface 30 of member 16 coincides with the pivot point 11 of the joint 10. As described above, member 16 moves when the joint 10 rotates, but at all times the spherical center of the spherical surface 30 of member 16 substantially coincides with the pivot point 11 of the joint 10.

The spherically-shaped surface 30 of member 16 faces the detector 18, and defines a range of acceptable rotation for the joint 10. The peripheral edge 28 of member 16 defines the limit of acceptable rotation for the joint 10.

Figure 1:
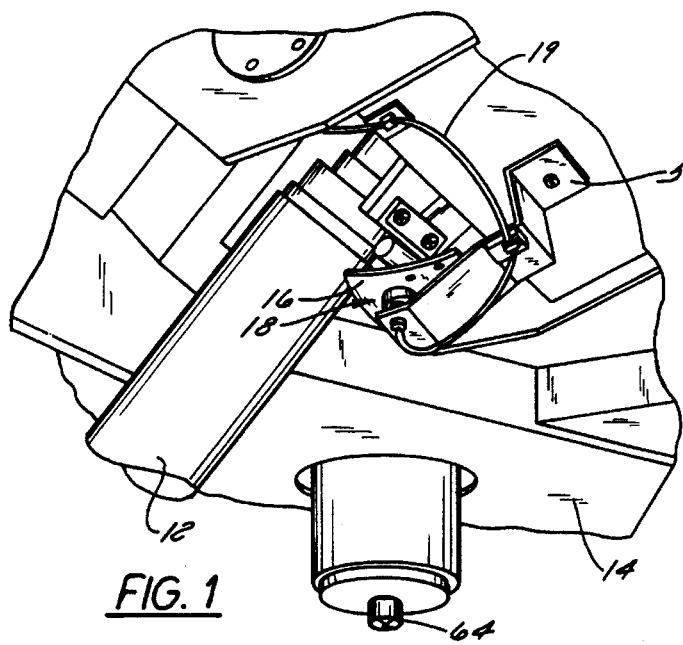
FIG. 1 is a perspective view of the preferred embodiment of the present invention.
Figure 10:
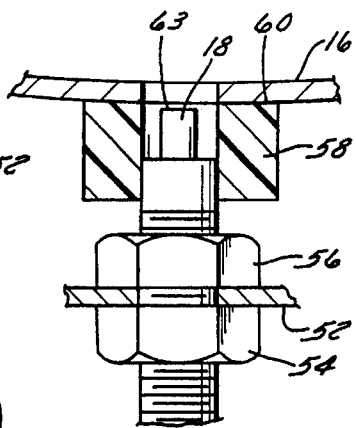
FIG. 10 is a cross-sectional view of a detector in accordance with the invention shown as an inductive proximity detector.

Referring to FIG. 10, the detector 18 is mounted to the support 14 using a detector bracket 52. The detector 18 is mounted to the detector bracket 52 using nuts 54 and 56. The detector 18 can be any type of detector which can detect the location or presence of member 16. It is preferred, however, that the detector 18 be an inductive proximity switch. A suitable proximity switch is the Honeywell Microswitch Catalog No. 921AA1Y proximity switch with an accompanying amplifier Catalog No. 927FL11. This particular amplifier is especially desirable because it can continuously test the detector 18 for operability.

The detector 18 is surrounded by a plastic collar 58. A front face 63 of the detector 18 resides slightly below a front surface 60 of the collar 58. The collar 58 holds the detector 18 away from the cam 16 a few thousandths of an inch to reduce wear of the detector 18 and prevent galling of member 16. The collar 58 also prevents the switch 18 from falling off the peripheral edge 28 of member 16 as member 16 rotates. Thus, the detector 18 is prevented from catching on the peripheral edge 28 when member 16 rotates beyond the range of acceptable rotation and returns to a normal operating position.

It is preferred to spring load the detector 18 so that the collar 58 contacts the cam surface 30 lightly. Spring loading can be accomplished by using a spring mechanism (not shown), or by shaping bracket 52 in such a manner that the collar 58 presses lightly against member 16 but can be displaced therefrom by flexing the bracket 52 away from member 16. Spring loading allows the detector 18 to maintain its accuracy even though the cam surface 30 may not be perfectly spherical or perfectly centered around the pivot point 11, or even though the pivot point 11 may not be perfectly fixed with respect to detector 18.

The detector 18 generates a signal in a wire 19 which indicates whether the cam surface 30 is present between the face of the detector 18 and the pivot point 11. The signal in wire 19 is transmitted to the computer 101 as depicted in FIGS. 8 and 9.

When the signal transmitted to the computer 101 indicates that contoured surface member 16 is not present between the detector 18 and the pivot point 11, the computer 101 transmits adjusted output position commands so that the coordinated movement of the legs 12 can reverse the direction of rotation of the particular leg 12, and thus prevents the particular joint 10 from rotating beyond the limit of acceptable rotation.

Alternatively, the signal in wire 19 can be transmitted directly to the motor 34 and trip a switch so that the motor 34 reverses itself. While this approach may be the most direct and simple, it might not be appropriate in all situations, especially where the rotation of the joint 11 can depend on more than simply the direction of one motor.

While the invention has been shown in conjunction with a six axis machine tool, it should be appreciated that the invention can operate in association with any joint allowing two dimensional rotation about a pivot point 11. That is, contoured surface member 16 and detector 18 system can be used to detect whether a joint has been rotated beyond a limit of acceptable rotation, no matter how the joint is rotated.

It should also be appreciated that the spherical surface 30 of member 16 may be placed anywhere where the spherical center of the spherical surface 30 coincides with the pivot point 11. The only limitation is that member 16 should not be located such that the detector 18 will lie in a plane defined by two of the orthogonal axes of the joint. If the detector 18 were so positioned, it would respond to motion about only one axis.

The invention also contemplates reversing the placement of the detector 18 and member 16. For instance, the detector 18 can be mounted to a modified bracket 50 and member 16 can be mounted to a modified bracket 52. In such a system, the surface 30 of member 16 facing the detector 18 should be spherical and the center of the sphere should coincide with the pivot point 11.

The preferred form of detector is one that senses the presence (i.e. the proximity) of the surface of the cam. In addition to an inductive detector, air detectors, magnetic detectors, radiation detectors, or infra-red detectors could be used as examples.

The invention also contemplates using a different configuration to detect the location of the peripheral edge 28 of member 16. It is contemplated that a detector 18 could continuously detect a distance to the peripheral edge 28 of member 16. Such a detector 18 could transmit a continuous signal proportional to the distance between the detector 18 and the peripheral edge 28 of member 16 to the computer 101. This would allow the computer 101 to narrow the safety margin as the maximum speed of approach to the critical area is gradually reduced. Any number of discreet states could be substituted for the continuous signal with a slight loss of utility.

While particular embodiments of the invention have been shown and described, it will be understood, of course, that the invention is not limited thereto since modifications may be made by those skilled in the art, particularly in light of the foregoing teachings. It is, therefore, contemplated by the appended claims to cover any such modifications within the true spirit and scope of the invention.

We claim:

1. A method for preventing a joint that can rotate around a pivot point from rotating beyond a limit of acceptable rotation, the method comprising:

supporting the joint so that the pivot point of the joint is stationary with respect to a support;

mapping a range of acceptable rotation for the joint on a spherical surface where a boundary of the spherical surface corresponds to the limit of acceptable joint rotation;

locating the spherical surface so that a center of a sphere defining the spherical surface substantially coincides with the pivot point of the joint;

monitoring a relative location of the boundary as the joint rotates in one or more directions along a path; and if the relative location of the spherical surface is such that continued rotation of the joint along the path will cause the relative location of the spherical surface to be displaced beyond the boundary, then stopping rotation of the joint along the path before the joint rotates beyond the limit of acceptable rotation.

2. A method as recited in claim 1 wherein stopping rotation of the joint along the path before the joint rotates beyond the limit of acceptable rotation is accomplished by:

relaying a signal related to the relative location of the map to a machine controller;

using the signal in the machine controller to determine a proper direction to rotate the joint so that the joint does not rotate beyond the limit of acceptable rotation; and rotating the joint in the proper direction as determined in the machine controller.

* * * * *